Dec. 17, 1935.  H. A. ROSE ET AL  2,024,746
CURRENT REGULATOR
Filed Sept. 27, 1933   3 Sheets-Sheet 2

WITNESSES:
E. A. McCloskey.
S. A. Stricklett

INVENTORS.
Herbert A. Rose and
Albert J. Maslin.
BY
ATTORNEY

INVENTORS.
Herbert A. Rose and
Albert J. Maslin.
ATTORNEY

Patented Dec. 17, 1935

2,024,746

UNITED STATES PATENT OFFICE 2,024,746

CURRENT REGULATOR

Herbert A. Rose, Pittsburgh, and Albert J. Maslin, Sharon, Pa., assignors to Westinghouse Electric & Manufacturing Company, East Pittsburgh, Pa., a corporation of Pennsylvania Application September 27, 1933, Serial No. 691,174

7 Claims. (Cl. 175—363)

Our invention relates to a current regulating device and particularly to a regulating reactor for equalizing the currents in the sections of a sectionalized vapor-electric converter.

One of the outstanding advantages of the sectionalized mercury-arc converter lies in its inherent ability to operate at fractional capacity when one or more sections of the device are inoperative or for any reason out of service.

In the operation of sectionalized rectifiers, it has been found most economical to supply a group of sections—preferably two—in parallel from a single transformer winding and to provide a plurality of transformer windings corresponding to the groups of sections.

The transformer winding and the group of sections fed thereby has a regulation characteristic such that when the entire group is carrying load it divides load substantially evenly with the other groups of sections as well as with other converters supplying the load.

When for any reason one or more of the sections of a group are rendered inoperative, the regulation of the group remains substantially unchanged, consequently the active sections of the group must carry the group current when paralleling with the remaining groups or other sources of load current. As a consequence if one section of a two section group is rendered inoperative, the remaining section carries substantially double the normal current per section.

It is an object of our invention to provide a current regulator which is operative when one or more sections of a group are rendered inoperative to increase the regulation of the group so that the active sections parallel with the line at normal current per section.

It is a further object of our invention to provide a current regulator which is operative to increase the regulation characteristics of a group having one or more inoperative sections so that the group parallels with normal groups at normal current per section.

It is a further object of our invention to provide a system of connections for our regulators whereby their effectiveness is very materially increased with consequent reduction in cost and space requirements.

It is a further object of our invention to provide a regulating reactor having a substantially constant-regulating effect over a range from no load to 400% load per section.

Other objects and advantages will be apparent from the following detailed description taken in conjunction with the accompanying drawings, in which Figure 1 is a schematic illustration of a distribution system utilizing a preferred embodiment of our invention;

Figure 1:
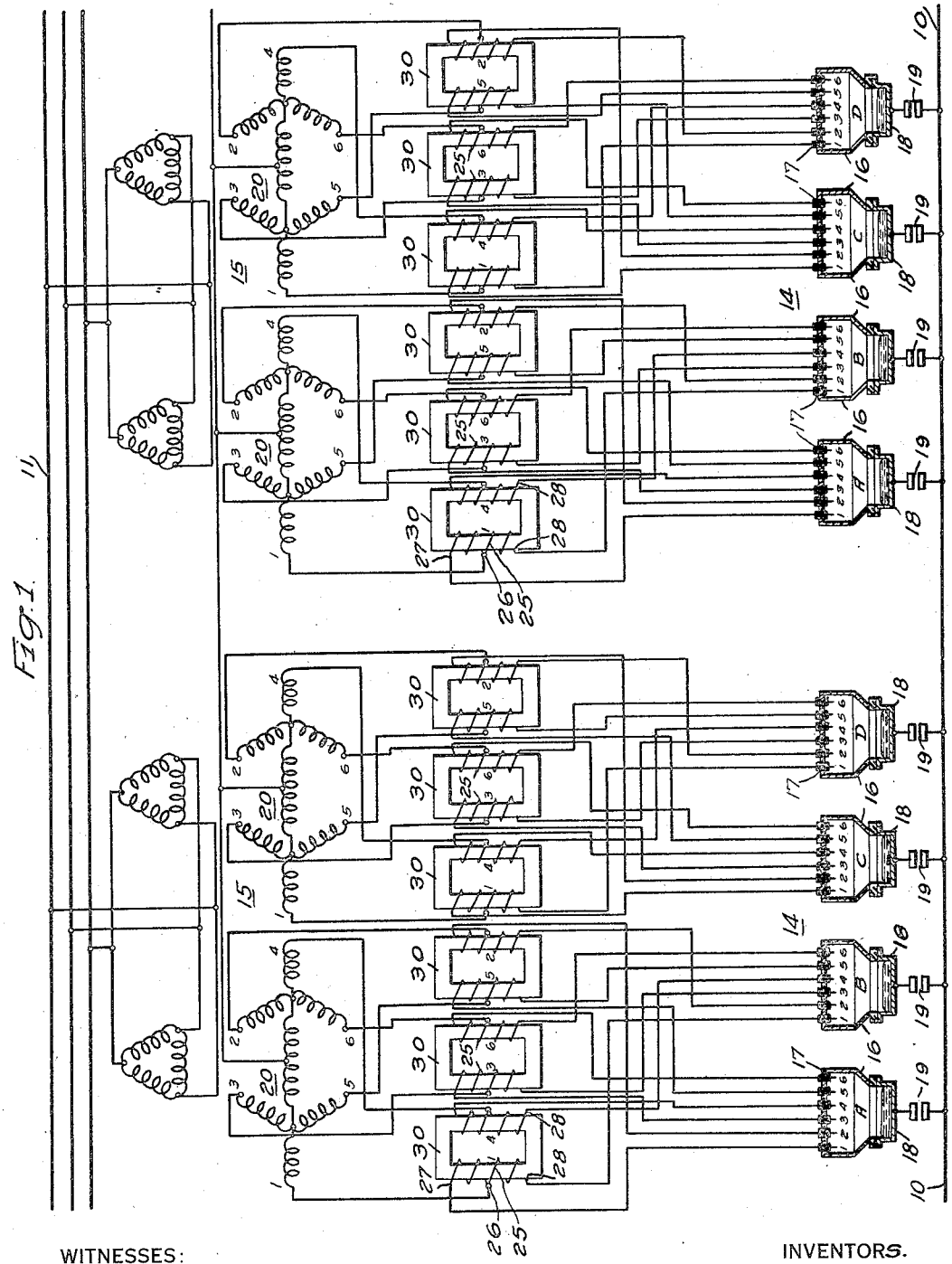

The apparatus according to our invention comprises a direct-current circuit 10 and an alternating-current circuit 11 connected by a plurality of converters. At least one of these converters comprises a sectionalized vapor-electric device 14 having a suitable transformer 15 for supplying energy thereto. Each of the sections 16 of the device 14 are preferably provided with a plurality of anodes 17 (designated 1 to 6) and a single cathode 18 which may be connected through a suitable circuit breaker 19 to one side of the direct-current line 10. We prefer to provide the transformer 15 with a plurality of winding sections 20 having secondary phase terminals 1 to 6 corresponding to the anodes 1 to 6 of each section 16. It has been found most advantageous to provide a transformer winding 20 adapted to supply a group of sections 16 of the sectionalized rectifier 14, there being as many transformer winding sections 20 as there are groups of rectifier-sections 16. Each transformer winding 20 has phase terminals 1 to 6 adapted to be connected to parallel anodes 1 to 6, said anodes being in separate rectifier sections 16.

While any number of sections 16 may be connected in parallel, for reasons of simplicity, we prefer to use two sections 16 per group. Connected between each phase terminal of the transformer winding 20 and the parallel anodes in the rectifier sections 16, we place the current regulator according to our invention.

In the preferred form of this regulator, we provide a reactance coil 25 having a mid-terminal 26 adapted to be connected to a phase terminal of the transformer winding 20 and end terminals 27 and 28 adapted to be connected to the parallel anodes. A suitable magnetizable core 30 is associated with this winding 25. In certain cases, the core 30 is provided with a suitable air gap 31 (Fig. 7) in order to more adequately control the reactance, the air gap being so proportioned with regard to the core that the reactance of the winding 25 will be maintained substantially constant over load ranges to approximately 400%.

For a current regulator adapted to be connected to two sections, it has been found desirable to design the regulator winding 25 with an unbalanced current reactance substantially equal to the normal reactance of the phase winding to which it is connected in order to secure the desired current or voltage regulation.

In the preferred embodiment of our invention, see Fig. 1, the current regulator not only provides an unbalanced current reactance for regulating the current delivered by the active section 16 when one of the sections of the group is rendered inactive, but also serves the purpose of an anode balance coil when both of the sections 16 are operating normally.

Figure 2:
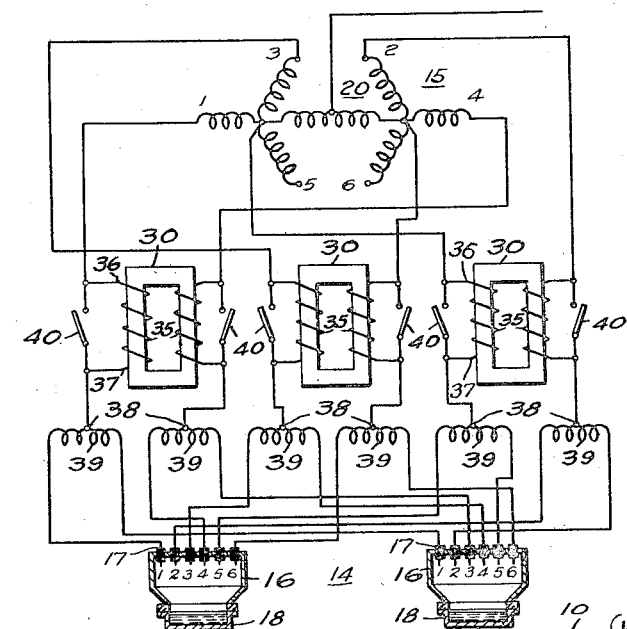
Fig. 2 is a simplified embodiment of our invention.

In the embodiment according to Fig. 2, a single section reactor 35 is used having one terminal 36 connected to the phase terminal of the transformer and the other terminal 37 connected to the mid-tap 38 of a suitable anode balance coil 39. A short-circuiting switch 40 is provided around this reactor 35 so that when both of the rectifier sections 16 are operative, the reactor 35 will be short circuited and ineffective to regulate the current delivered by the section group. However, when one of the sections 16 is rendered inactive, the short circuiting switch 40 is opened and the reactor 35 is effective to change the regulation of the remaining section. A suitable interlocking mechanism (not shown) can be introduced between the cathode circuit breakers 19, or at any other desired point, for insuring that the short circuit is removed from the regulating reactors 35 when one of the sections 16 is rendered inactive.

Figure 3:
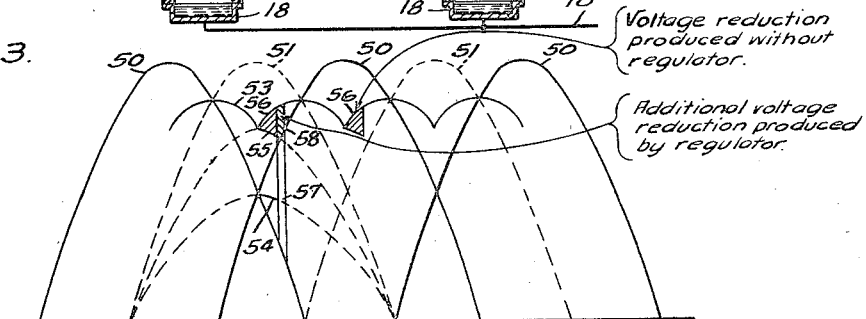
Fig. 3 is a graphical illustration of the manner of operation of our regulator.

The operation of our regulator is best explained by a consideration of Fig. 3. In a valve-type converter operating double three phase such as shown in Figs. 1 and 2, the alternate three phase voltages (curves 50—51) are averaged by an interphase winding to provide a light load direct current voltage as shown at 53.

However when the valves are passing a considerable current there is an overlap or commutating time during which the voltage of one of the three phase elements follows along the curve 54 through an angle sufficient to commutate the valves. Since the voltage follows the curve 54 the interphase causes the direct current voltage to follow the mediam between curve 54 and 51 as shown at 55 so that the effective voltage is reduced by an amount represented by the cross hatched area 56. The amount of this reduction of the effective direct current voltage is a measure of the regulation of the converter.

By inserting an additional impedance such as the regulators 25 or 35 the overlap angle can be extended as shown at 57 producing an additional area as shown at 58. If the impedance 25 or 35 is substantially equal to the normal impedance of the valve circuits, the area 58 will substantially equal the area 56 and accordingly double the regulation of the section.

In the operation of a plurality of converters operating in parallel it is highly desirable that all have substantially the same regulation characteristics in order to divide the load in proportion to the capacity of the converters. Consequently, if the capacity of one of the converters is reduced it is necessary to increase the regulation of that converter to prevent overloading at the reduced capacity.

In the four section valve type converter as shown in Fig. 1 the converter may operate at ¼, ½, ¾ or full capacity and by means of our regulator the regulation is changed so that the regulation at partial capacity produces the same current per section as would obtain at full capacity operation.

Figure 4:
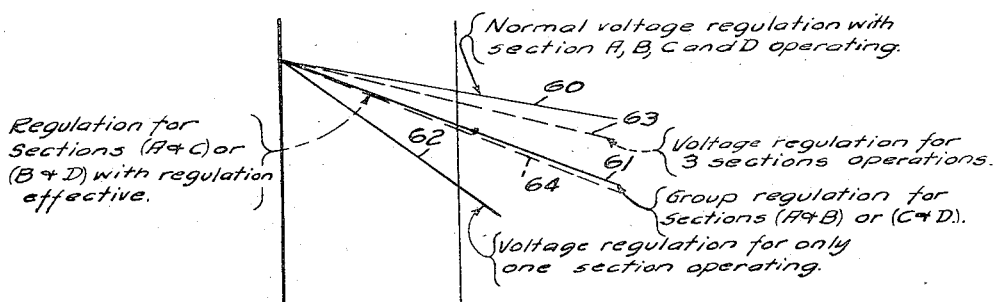
Fig. 4 is a graphical illustration of the voltage regulation characteristics obtained by our invention.

Referring to Fig. 4, curve 60 shows the regulation of the device with sections A, B, C, D operating.

For convenience and economy the converter is divided into two groups A—B and C—D each group being fed from a substantially independent section 20 of the transformer 15. The impedance of the groups with their associated equipment is such that the group regulation permits the group to parallel with the line 10 being fed. If either group is operating alone the capacity of the converter is reduced to 50%, while the capacity and regulation of the group is unchanged as shown at 61 or normal regulation per group.

If shown only a section such as A of the group A—B was operating without a regulator the normal impedance of the group is substantially unchanged so the operative section would tend to carry the total group current. By introducing our regulators 25 or 35 the regulation of the partial section will be increased as shown by curve 62 of Fig. 4 so that at 100% load on the section or 25% load on the converter the voltage drop will be identical to the voltage drop of other converters operating at 100% load so that the converter takes load in proportion to the active capacity.

It follows that with one section inoperative the regulator controls the current of the active section of the partial group and the full group remains unregulated so that the converter operates at 75% capacity with a regulation as shown at 63.

Also when one section of each group is operating, the regulators control each section as shown at 62 while the regulation of the converter follows the curve 64 substantially identical with curve 61 so that the converter operates at 50% capacity with 100% current per section.

Figure 5:
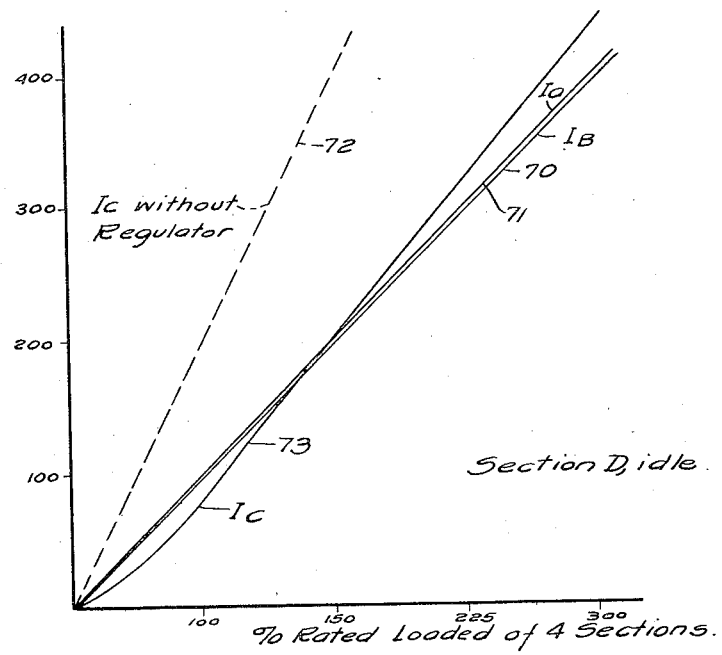
Fig. 5 is a graphical illustration of the current regulation characteristics obtained by our invention.

A graphical illustration of the results obtained on test of our converter is shown in Fig. 5. Sections A, B, and C were operating while section D was disconnected. The percent current in sections A and B comprising the normal group increased in proportion to the rated percent of the load on the converter, see curves 70—71. Without the regulator the current in section C increased much faster than the percent load on the converter as shown at 72 so that the permissible current in section C limited the total output. However, with the regulator in operation the current in section C developed along the curve shown at 73 showing a regulation of current in the unbalanced section substantially identical with the current per section in the normal group.

Figure 7:
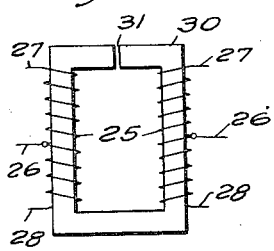
Fig. 7 is a schematic view of a modification of our current regulator.

While we have found that solid core regulators give a characteristic as shown by curve 73 which is usually satisfactory, it may be desirable in certain cases to bring curve 73 into substantial coincidence with curves 70—71. This can be accomplished by providing the cores 30 with a suitable non-magnetic position 31 as shown in Fig. 7.

While any suitable reaching device having the desired characteristics may be employed, we have discovered that by suitable connections a very economical design of regulator may be obtained.

In the connections according to our invention two regulator windings 25 or 35 are associated with a single core 30 and connected to the valves in such a manner as to obtain cyclic flux reversals in the core when the regulator is operative. Each of the coils 25 or 35 are connected to separate phase terminals preferably to opposite phase terminals such as (1) and (4) so that the current in the one phase has died out before current starts to flow in the other.

In the modification according to Fig. 2 current flow through the coils 35 located on the same core 30 reverses the flux direction in the core 30 when one section is inoperative. In the preferred modification according to Fig. 1, two of the split coils 25 are associated with a common core 30 and the terminals so connected that current flow through the coils to any one of the sections produces cyclic reversals of flux in the core 30 associated therewith.

For example, assuming tank A operative and tank B disconnected, then current from phase (1) of the winding 20 through that portion of coil 25 connected to the No. (1) anode of tank A establishes a counterclockwise flux in core 30 and current from phase 4 of the winding 20 through that portion of coil 25 connected to anode No. (4) of tank A produces a clockwise flux in core 30 thus reversing the residual flux left by current from phase (1).

Figure 6:
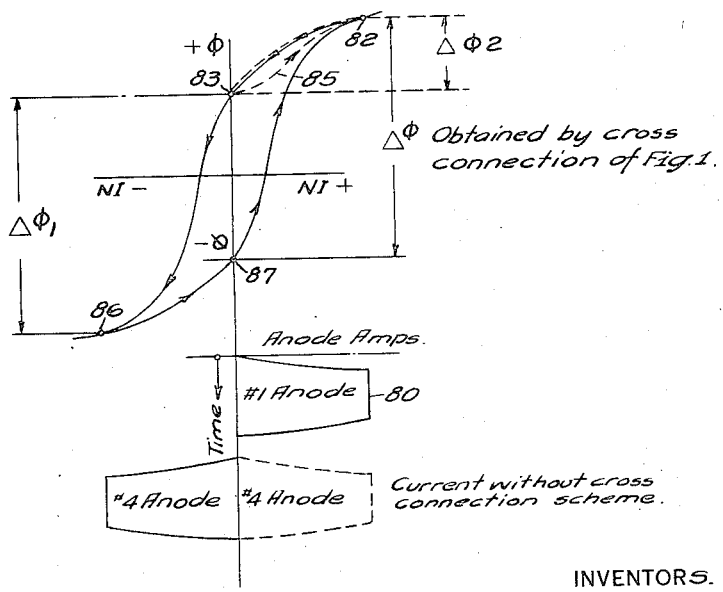
Fig. 6 is a graphical presentation of the advantages obtained by our system of connections for our regulators.

The advantages of this system of connection for our regulators are graphically illustrated in Fig. 6. With one of the tanks disconnected the initial current 80 to anode No. 1 would produce a flux having a maximum shown at 82 which would fall to a residual value 83 when the current ceased flowing in anode No. 1. Then, if the coils 25 are not connected to secure flux reversal the current flowing in No. 4 anode produces a flux illustrated at 85 and an effective flux change as shown by $\Delta\phi_2$. Because of the effect of the residual flux a large regulator is required to effect the desired regulating effect. However if the coils 25 are connected according to our system the current flowing in anode 4 produces a flux change from 83 to 86 and back to 87 producing an effective flux change as shown by $\Delta\phi_1$, thereby operating the material of the regulator at maximum efficiency so that a very economical design of regulator produces the desired regulating characteristic.

While for the purpose of illustration we have shown and described specific embodiments of our invention, it will be apparent to those skilled in the art that changes and modifications may be made therein without departing from the true spirit thereof, or from the scope of the appended claims.

We claim as our invention:

1. A vapor-electric converter system comprising a vapor-electric device having a plurality of parallel arc-chambers, a plurality of valves in each arc chamber, a transformer for supplying current to said arc-chambers, said transformer having an independent winding for each pair of arc-chambers, said winding having a plurality of phase terminals for connection to the valves in a pair of arc-chambers, a current regulator comprising a winding having terminals connected to a valve in each of the pairs of arc-chambers, a terminal connected to a phase terminal of the winding, a core in said winding, said winding having an unbalanced current reactance, when one of said arc-chambers is inactive, of the order of the reactance of the phase winding connected thereto and means in said core for maintaining said reactance substantially constant for all loads up to 300% of rated load on each arc-chamber.

2. An electrical conversion system comprising a multi-section arc-discharge device, a plurality of anodes in each of said sections, a transformer for supplying current to said device, phase windings in said transformer adapted for connection to said anodes, each of said phase windings being connected to anodes in separate sections, a regulating reactor interposed between the phase winding and the parallel anodes, said reactor having an unbalanced current reactance substantially equal to the normal reactance of the phase winding when one of the sections is rendered inactive for increasing the commutation angle of the remaining sections.

3. In a sectionalized converter having a plurality of sections fed from a source of current having a plurality of phase terminals, a current regulator comprising a winding having a mid terminal connected to a phase terminal of the current source and end terminals connected to parallel anodes in separate sections, a core in said winding, and means in said core for controlling the reactance of said winding up to 150% of rated current of said converter sections.

4. In a sectionalized converter having a plurality of sections fed from a source of current having a plurality of phase terminals, a current regulator comprising a winding having a terminal connected to the phase terminal of the current source and terminals connected to parallel anodes in separate sections, a core in said winding, a second winding associated with said core, the terminals of said second winding being connected to a phase terminal of said source and to anodes in the same sections as said first winding, the windings being so connected to said anodes that when one of said sections is inoperative the current through said windings produce cyclic flux reversals in said core.

5. An electrical distribution system comprising a plurality of converters for transferring energy to a common load circuit, at least one of said converters being a sectionalized vapor-electric device, a plurality of anodes in each section of the device, a transformer for supplying current to said device, a winding in said transformer having a plurality of phase terminals adapted for connection to the anodes, each of said terminals being connected to at least two anodes in parallel, said anodes being in separate sections, the device and its supply transformer having a regulation characteristic such as to insure parallel operation with remaining converters connected to the common load circuit, a current regulating reactor connected between each phase terminal of the transformer winding and the parallel anodes connected thereto, said reactor being effective when one section of said device is rendered inactive for altering the regulation characteristic of the remaining sections so that they parallel with the remaining converters while assuming load proportional to the number of active sections.

6. An electrical conversion system comprising a multi-section valve type converter, each section of said converter having a plurality of successively operable valves, a winding for feeding current to said converter, a plurality of phase terminals on said winding each of said terminals being adapted for connection to a plurality of electrodes in said converter, the electrodes adapted to be connected to a common terminal being in separate sections of the converter, said anodes being connected to each other through a reactor the center point of which is connected to a phase winding, said reactor being operative when one of said sections is rendered inactive to increase the voltage regulation of the remaining sections.

7. An electrical conversion system, comprising a multi-section valve-type converter, each section of said converter having a plurality of valves, a current source adapted for connection to said converter, said source having a plurality of terminals for connection to the valves of said converter, each of said terminals being connected to a plurality of valves, said valves being in separate sections of said converter, a current regulator connected between the parallel valves and having a mid tap connected to a phase terminal, said regulator being operative, when one of the sections is rendered inoperative, to increase the voltage regulation of the remaining sections.

HERBERT A. ROSE.
ALBERT J. MASLIN.